W. T. JAMES.
MATERIAL HANDLING APPARATUS.
APPLICATION FILED MAR. 30, 1908.
1,050,945.
Patented Jan. 21, 1913.
5 SHEETS—SHEET 1.
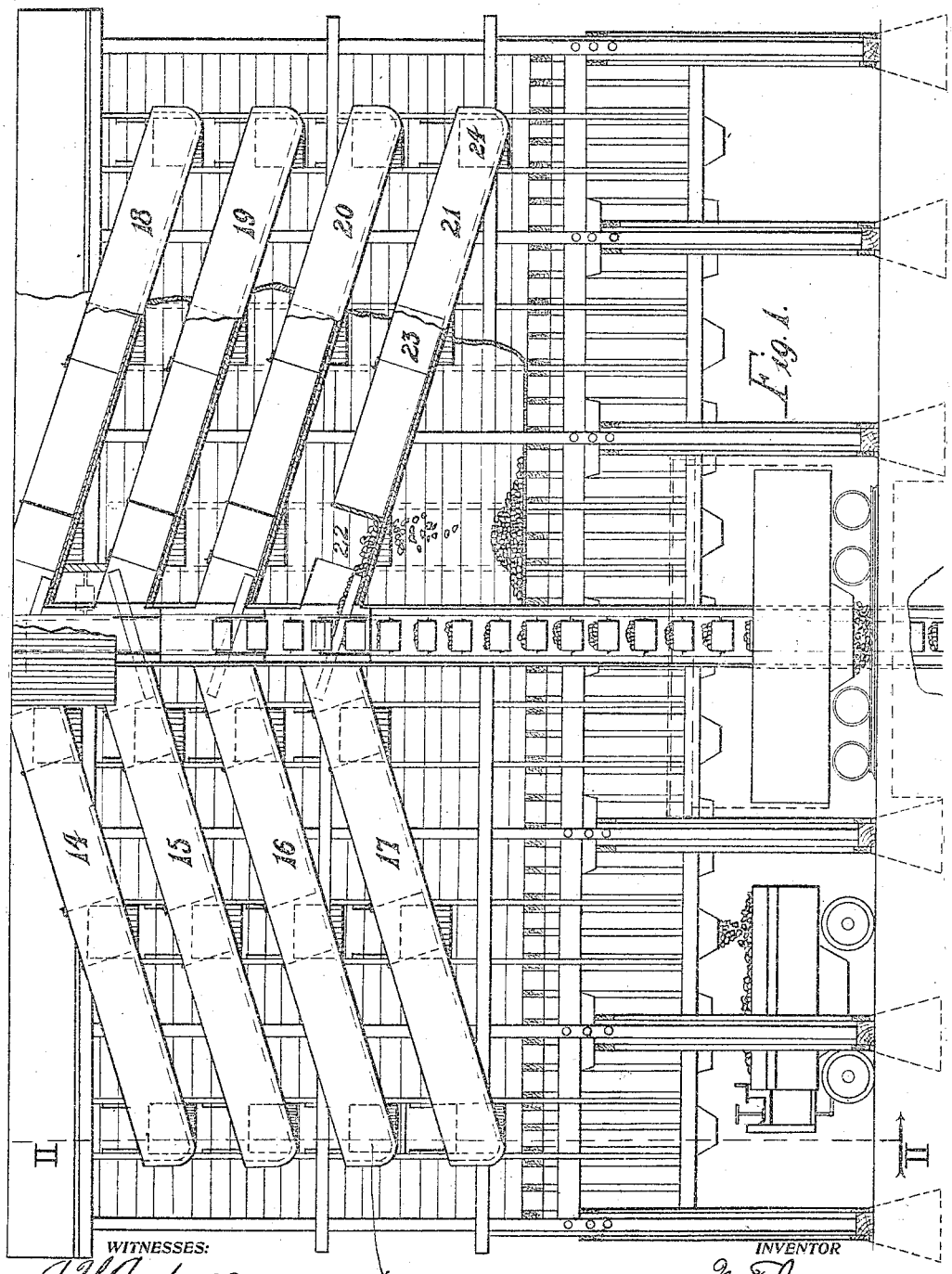
WITNESSES:
INVENTOR
ATTORNEYS

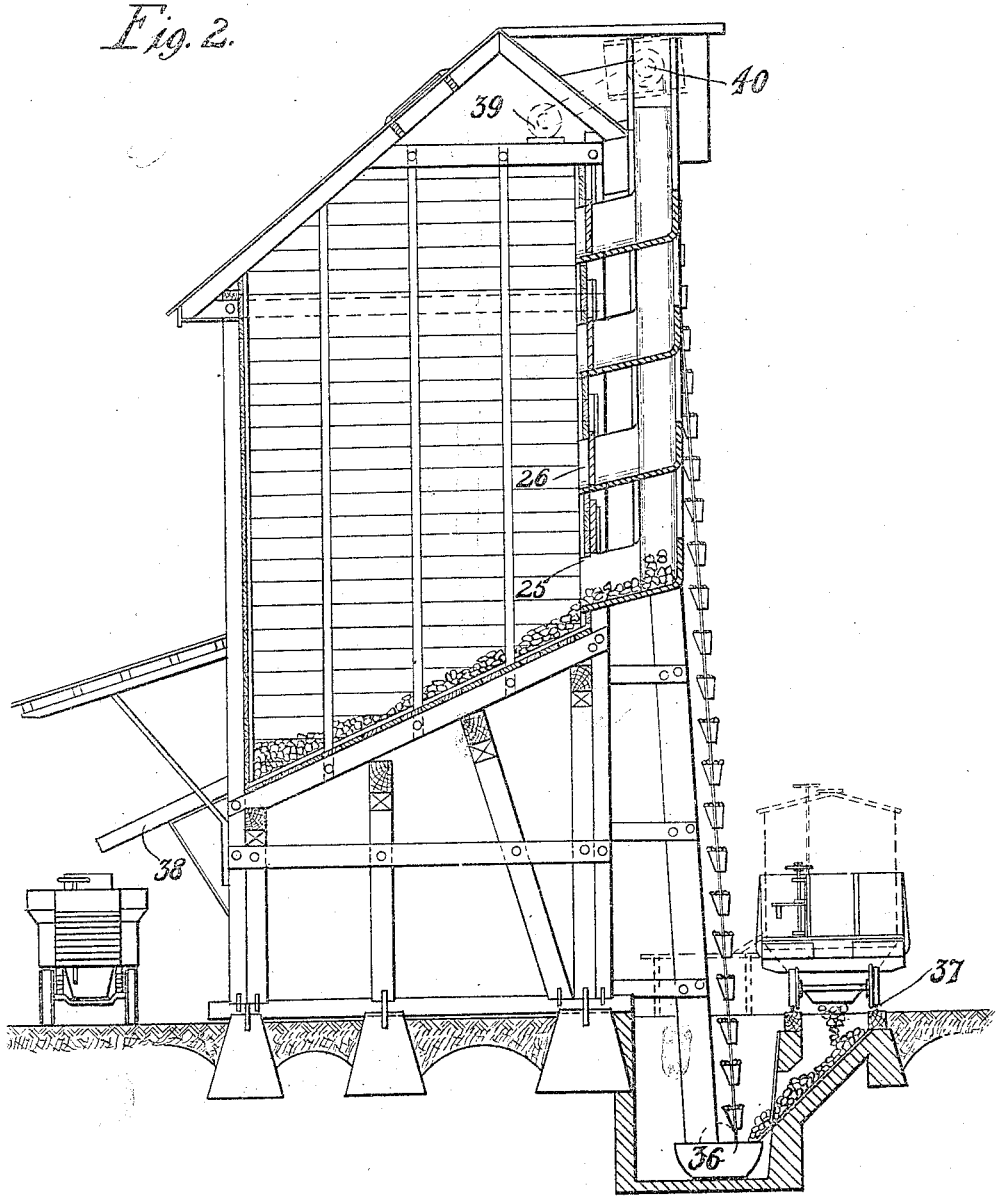

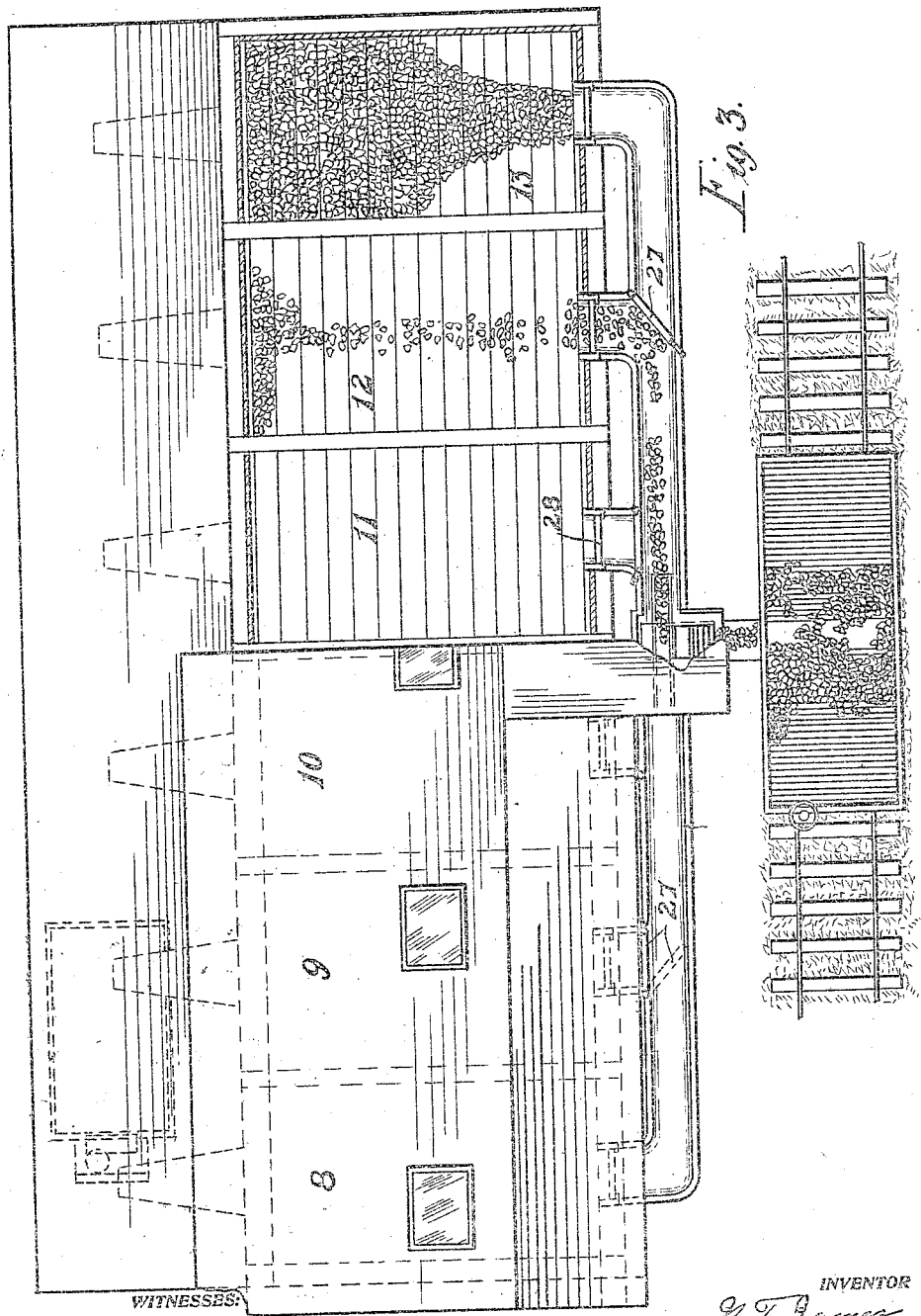

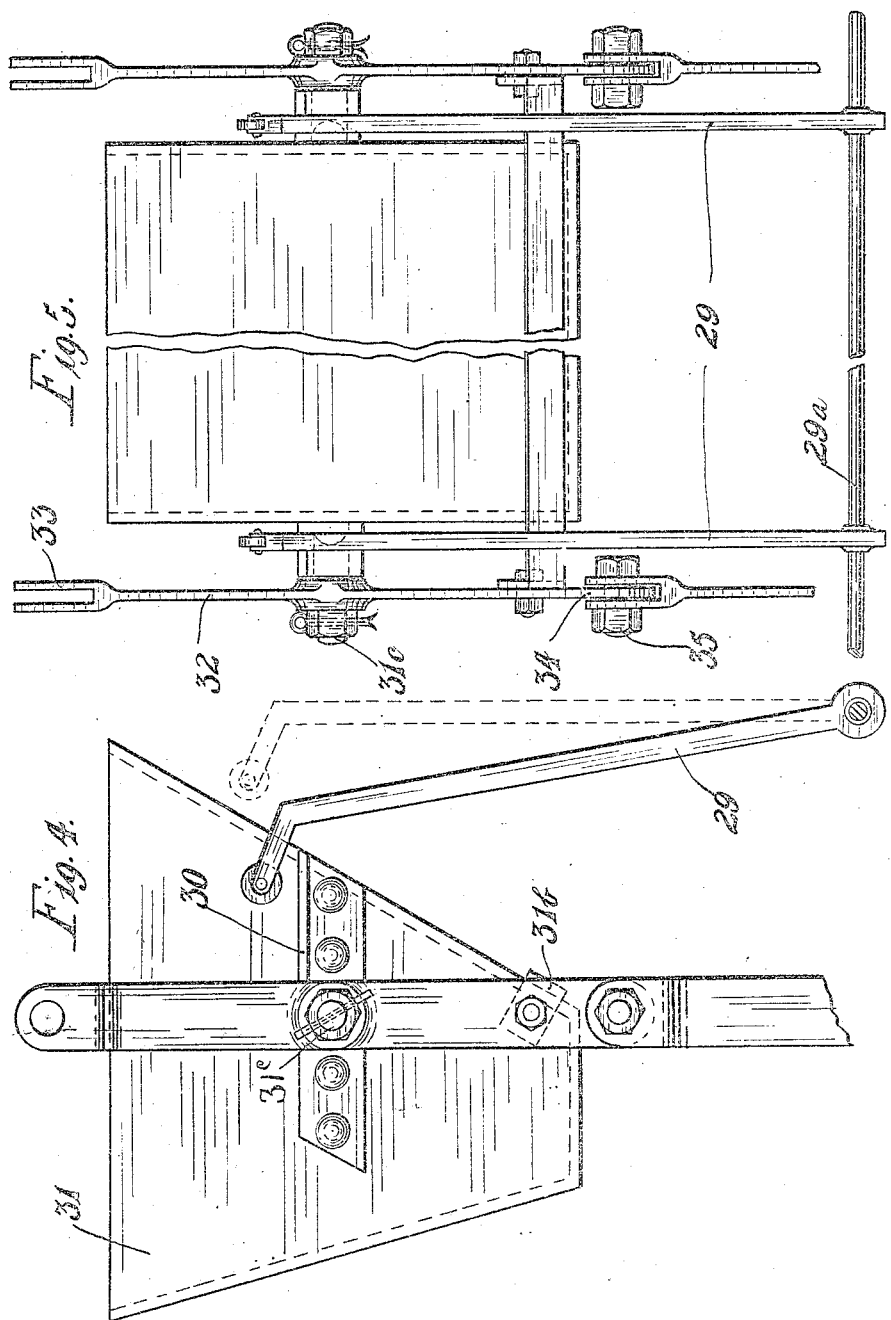

W. T. JAMES.
MATERIAL HANDLING APPARATUS.
APPLICATION FILED MAR. 30, 1908.

1,050,945.

Patented Jan. 21, 1913.

5 SHEETS—SHEET 5.

WITNESSES:
A. Y. Andrews
G. W. Cunningham

INVENTOR
W. T. James
BY
Synnestvedt & Carpenter
ATTORNEYS

UNITED STATES PATENT OFFICE.

WILLIAM T. JAMES, OF CHICAGO, ILLINOIS.

MATERIAL-HANDLING APPARATUS.

1,050,945.  Specification of Letters Patent.  Patented Jan. 21, 1913.

Application filed March 30, 1908. Serial No. 424,242.

*To all whom it may concern:*

Be it known that I, WILLIAM T. JAMES, a citizen of the United States, residing at Chicago, in the county of Cook and State of Illinois, have invented certain new and useful Improvements in Material-Handling Apparatus, of which the following is a specification.

This invention has reference to the provision of a certain improved form of material handling apparatus wherein provision is made for the storage of coal and other material, its conveyance from a point adjacent the delivery track, to such storage means, and also means for distributing the material and afterward for delivering it to other vehicles or in other places where it is to be used.

The novelty resides in the particular construction and arrangement of parts all as more fully hereinafter described and illustrated in the accompanying drawings, in which—

Figure 6:
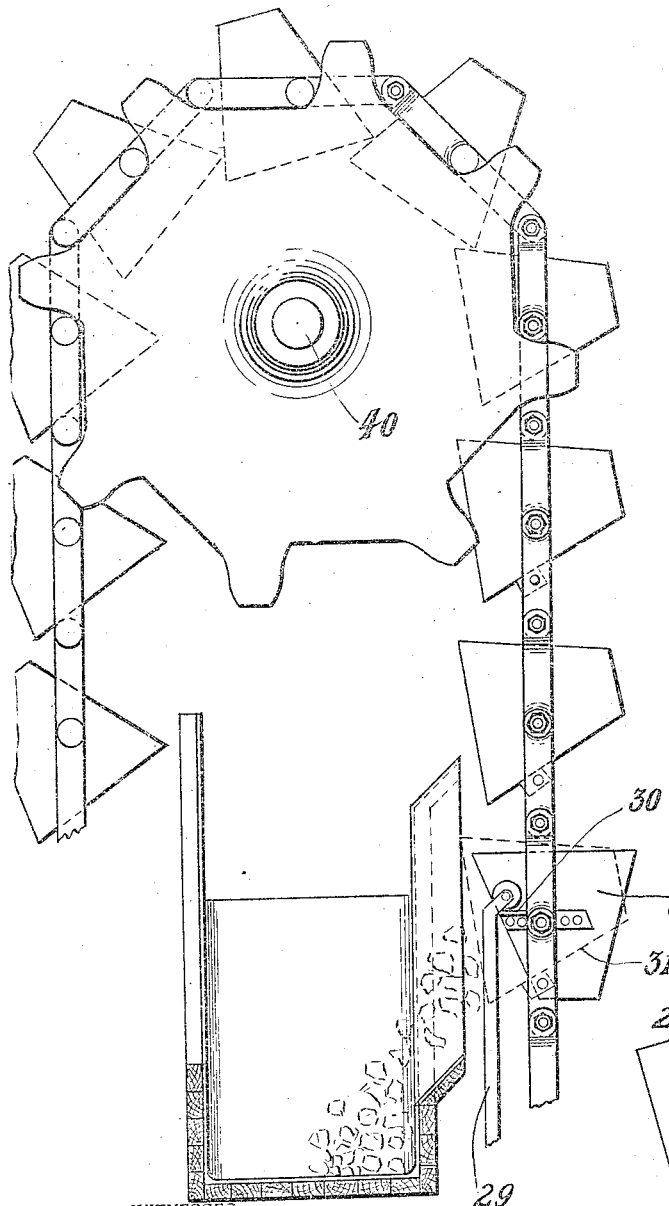
Figure 7:
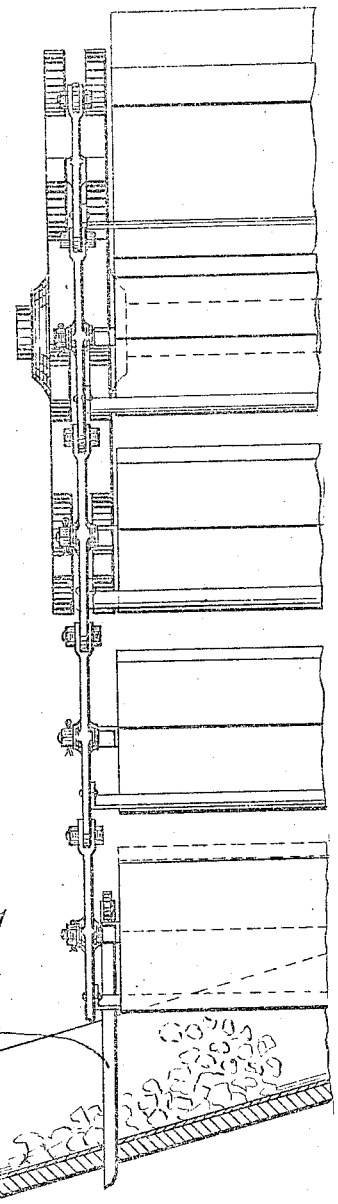

Figure 1 indicates an elevation partly in section, of an improved apparatus embodying my invention; Fig. 2 is a transverse section through the same on the line II—II of Fig. 1; Fig. 3 is a plan section; Fig. 4 indicates a detail of the carrier bucket mechanism and the tripping device; Fig. 5 is another elevation of the same; Fig. 6 shows the sprocket wheel at the upper end of the conveyer chain, and Fig. 7 is a side view of the apparatus shown in Fig. 6.

Referring now more particularly to Figs. 1, 2, and 3, it will be seen that in carrying out my invention I provide a plurality of storage bins or pockets numbered respectively from 8 to 13 and located inside of a building with openings leading inward to said pockets from chutes which are without the building and extend, as shown clearly in Fig. 1, in an inclined direction, either way from a central elevating or conveying mechanism, at various different heights, as indicated for example in the places marked 14 to 21 inclusive. As a means for determining the bin or pocket into which the material is to be delivered by this mechanism, I provide a plurality of openings extending laterally in from the chutes, as indicated at 22, 23, and 24, for example, in the lowermost chute on the right side of Fig. 1, and in order to provide for the delivery of the material in the first instance when the bins are empty near the bottom of the same, the bottom of the bin being arranged of course on an incline as indicated in Fig. 2, I provide a series of inlet openings indicated at 25 and 26 and arranged so that after the material has filled into the bin at a point up to about where the line 25 is placed, it can then be diverted into the chute immediately above and delivered through the opening 26, and in neither case will it have very far to fall in finding its resting place.

As a convenient means for switching or determining the direction of delivery I provide suitable doors preferably pivoted and arranged as indicated at 27, in Fig. 3, and in order to control the openings into the bins or pockets I provide vertically slidable gates 28 as also shown in Fig. 3, by which any desired opening may be closed at any time, or opened, as required, and by which also the apertures may be kept closed to avoid the entry of moisture or rain, or other elements injurious to the material stored.

As a specific means for conveying the material I provide buckets 31 of the character shown clearly in Figs. 4 and 5, having stop flanges or projections 30 adapted to coöperate with a projecting lever carrying a roller in its end, indicated at 29, which stop lever or trip device may be moved out of position as shown in dotted lines in Fig. 4, when it is desired to have the bucket trip at another position.

The conveyer is arranged to pick the material up from a bin 36 located at the base thereof in position to receive the material through a chute extending into said bin from beneath the cars which are run in on a track 37, while at the opposite side of the storage structure, I provide suitable delivery spouts as indicated at 38, which may be utilized for loading wagons or other conveyances intended for distribution of the material. The power is preferably supplied by some form of motor device as indicated at 39, operating the shaft 40 which carries the sprocket at the upper end of a conveyer chain.

A stop 31ᵇ is provided for the bucket as indicated in Figs. 4 and 5, and the two upright trip levers 29 are mounted on a cross shaft 29ᵃ so they may be oscillated together conveniently.

The bucket 31 is carried on convenient trunnion support 31ᶜ in chain links 32, the upper end whereof is formed of a forked or bifurcated shape as indicated at 33, and the lower end is single or plain as shown at 34, to engage the bifurcated end of the next succeeding link member, the two being held together by suitable bolts as shown at 35 in Fig. 5.

Having thus described my invention and illustrated its use, what I claim as new and desire to secure by Letters Patent, is the following:

1. A material handling apparatus comprising in combination a plurality of receiving pockets, there being openings leading inward to said pockets, chutes outside said inclosure and extending inclinedly at different heights and in opposite directions, and elevating mechanism arranged to deliver material between the adjacent ends of said chutes.

2. A material handling apparatus comprising in combination a plurality of receiving pockets, there being openings leading inward to said pockets, chutes outside said inclosure and extending inclinedly at different heights and in opposite directions, elevating mechanism arranged to deliver material between the adjacent ends of said chutes, the bottoms of said pockets being inclined, and means whereby the material may be delivered to the lowermost pocket first, and to the others in succession.

3. A material handling device comprising a plurality of pockets, inclined chutes extending in opposite directions from the median line of said pockets, the discharge ends of said chutes emptying into said pockets at a plurality of points, a conveying mechanism arranged to deliver material at points adjacent the adjacent ends of said chutes, and switching means for determining the direction and point of delivery of the material.

4. A material handling device comprising a plurality of pockets, inclined chutes extending in opposite directions from the median line of said pockets, the discharge ends of said chutes emptying into said pockets at a plurality of points, a conveying mechanism arranged to deliver material at points adjacent the adjacent ends of said chutes, switching means for determining the direction and point of delivery of the material and means for controlling the discharge from said chutes into said pockets, the closing means for each chute being independent of the others.

In testimony whereof I have hereunto signed my name in the presence of the two subscribing witnesses.

WILLIAM T. JAMES.

Witnesses:
PAUL CARPENTER.
G. W. CUNNINGHAM.